W. R. CLARK.
Fruit Drier.

No. 97,168.　　　　　　　　　Patented Nov. 23, 1869

Attest
A. Ruppert
Ed. J. Eils

W. R. Clark
Inventor
D. P. Holloway & Co.
Atty

United States Patent Office.

WILLIAM R. CLARK, OF INDIANOLA, ILLINOIS.

Letters Patent No. 97,168, dated November 23, 1869.

FRUIT-DRIER.

The Schedule referred to in these Letters Patent and making part of the same.

*To all whom it may concern:*

Be it known that I, WILLIAM R. CLARK, of Indianola, in the county of Vermilion, and State of Illinois, have invented certain Improvements in Fruit-Driers; and I do hereby declare that the following is a full, clear, and exact description thereof, reference being had to the annexed drawings, making part of this specification, in which—

Corresponding letters refer to corresponding parts in the several figures.

Figure 1:
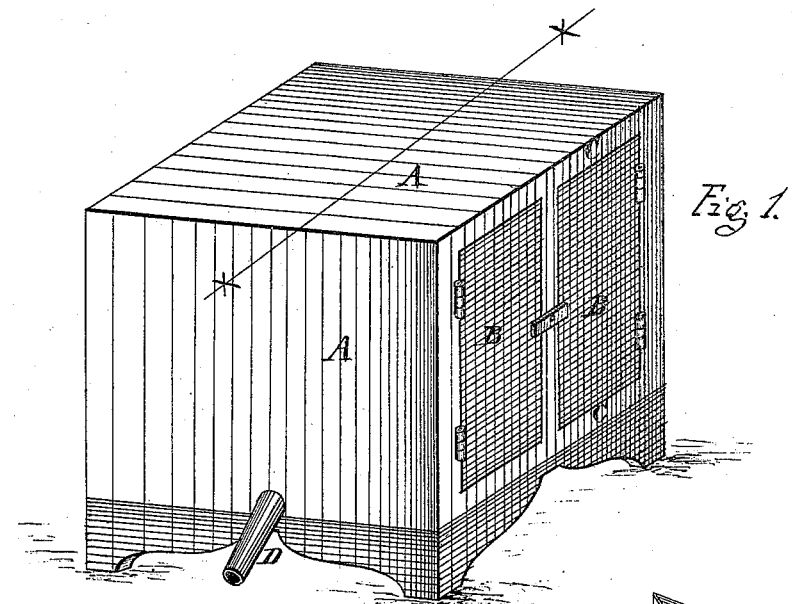
Figure 1 is a perspective view of my improved device, showing the pipe through which steam is admitted, and the water of condensation discharged, and the doors for closing the apertures through which the fruit is passed into and out of the drier.
Figure 3:
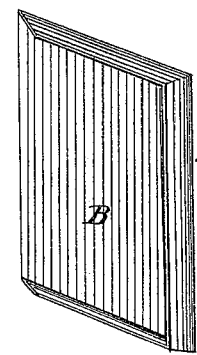
Figure 3 is a perspective view of one of the doors.
Figure 2:
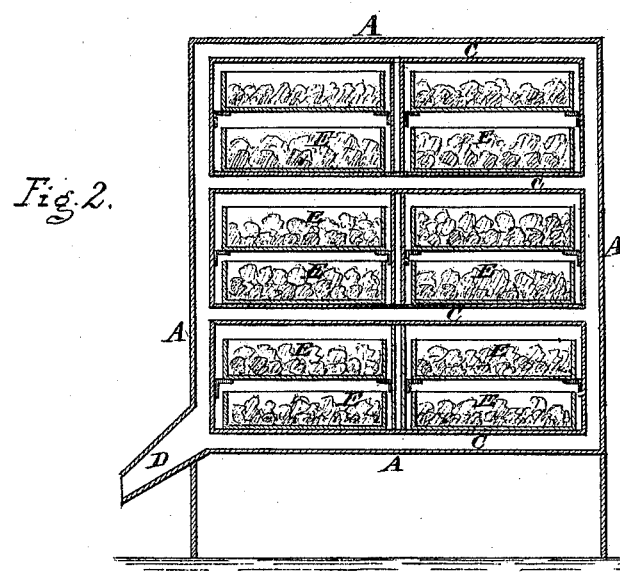
Figure 2 is a transverse vertical section on line *x x* of fig. 1, showing the steam-chambers, and the pans in which the fruit is placed, in position.

This invention relates to that class of devices in which fruit is dried by being placed in pans, or on shelves, and passed between the walls of the device, which walls are made with a steam-space in them, for the purpose of heating the same; and It consists in the combination and arrangement of the parts of which it is composed, as will be more fully described hereinafter.

A A, in the drawings, represent the case or walls of the drier, which consist of two plates, of metal or other suitable material, having between them a space of, say, one to three inches, for steam or heated air to pass, for the purpose of heating and drying the fruit. These spaces extend entirely around the device, upon the top and bottom, as well as the sides and ends.

B represents doors, which close the apertures through which the pans containing the fruit to be dried are inserted.

C C represent a series of horizontal partitions, which are provided with steam-spaces through them, from one side to the other. These partitions are so arranged, with reference to each other, that space is left between them for two pans of fruit or other material to be dried, which arrangement causes the heat to radiate upon the top and bottom of each series of pans, as well as upon their ends and sides, from the vertical spaces in the case.

D represents a pipe, which communicates with the spaces between the walls of the case, and serves as the induction-pipe for the heated air, when it is used as the medium for conveying heat to the drier, and for the induction-pipe for steam, when it is used, as well as for the exit-pipe for the water of condensation. The steam or air may be conducted to this pipe from the generator or furnace by means of any suitable pipe, which pipe may be made of any suitable flexible material, when it is desirable to have the drier portable.

E E represent a series of pans, in which the fruit or other material to be dried is to be placed, such pans being notched or serrated upon their edges, to permit the moisture which escapes from the fruit to pass off freely.

The lower one of the series of these pans or drawers rests upon the upper surface of the horizontal partition, and receives its heat direct from such surface, while the upper one rests upon angle-irons secured to the sides of the vertical walls of the device, and receive their heat, or a portion of it, from the next horizontal partition.

It will be observed that there are two doors upon the side of the drier. These doors may, if desired, be duplicated, the others being upon the opposite side, so that the pans or drawers may be inserted into or removed from either side of the device.

Between the series of pans, there is to be formed a vertical partition, which may be provided with a space, for the passage of air or steam, or it may be made solid, as preferred, its office being to divide the drier, vertically, into two compartments, each one of which shall be covered by a separate door, so that one of the compartments may be emptied of its contents, and refilled, while the drying-process is going on in the other, and thus a great economy of heat be effected, as it is apparent that the closed compartment would have its temperature only slightly affected by the opening of the doors of the opposite one.

I am aware that fruit-driers have heretofore been made with hollow walls, and that they have been supplied with pans or drawers, for the reception of the material to be dried. I do not, therefore, claim these devices broadly; but having thus described my invention,

What I claim, and desire to secure by Letters Patent, is—

A fruit-drier, combining, in its construction, a receptacle for the fruit, the walls of which have formed within them steam-spaces, said receptacle being also provided with horizontal and vertical partitions, having steam-spaces within them, the vertical ones being for the purpose of dividing the receptacle into two compartments, and a steam-induction pipe, arranged, as described, so as to serve as an induction-pipe for the steam, and an eduction-pipe for the water of condensation, substantially as and for the purpose set forth.

In testimony whereof, I have signed my name to this specification, in the presence of two subscribing witnesses.

WILLIAM R. CLARK.

Witnesses:
L. C. ROCKHILL,
WILLIAM McMILLAN.